(12) United States Patent
Williams

(10) Patent No.: US 6,463,668 B1
(45) Date of Patent: Oct. 15, 2002

(54) LOCATING AND TEMPLATE APPARATUS

(76) Inventor: Mark S. Williams, 645 N. Coville, Harrisville, MI (US) 48740

( * ) Notice: Subject to any disclaimer, the term of this patent is extended or adjusted under 35 U.S.C. 154(b) by 0 days.

(21) Appl. No.: 09/739,917

(22) Filed: Dec. 18, 2000

Related U.S. Application Data

(60) Provisional application No. 60/172,173, filed on Dec. 17, 1999.

(51) Int. Cl.[7] .................................................. G01B 5/18
(52) U.S. Cl. .................................... 33/528; 33/DIG. 10
(58) Field of Search .......................... 33/528, DIG. 10, 33/613

(56) References Cited

U.S. PATENT DOCUMENTS

| | | | |
|---|---|---|---|
| 1,612,455 A | | 12/1926 | McGeorge |
| 2,540,032 A | | 1/1951 | Johnson et al. |
| 2,775,812 A | | 1/1957 | Mohr |
| 2,887,776 A | | 5/1959 | Eisner |
| 2,898,688 A | | 8/1959 | Cottar |
| 2,992,490 A | | 7/1961 | Hay et al. |
| 3,154,304 A | * | 10/1964 | Crawford ............... 33/DIG. 10 |
| 3,745,664 A | | 7/1973 | Altseimer |
| 3,888,013 A | * | 6/1975 | Benoit .......................... 33/528 |
| 3,924,331 A | * | 12/1975 | Goosen ................. 33/DIG. 10 |
| 4,059,905 A | | 11/1977 | Wieting |
| 4,212,110 A | | 7/1980 | Hill, Jr. |
| 4,228,592 A | | 10/1980 | Badger |
| 4,259,785 A | | 4/1981 | Wortham |
| 4,339,973 A | * | 7/1982 | Lawrence ............... 33/DIG. 10 |
| 4,372,050 A | | 2/1983 | Eisenhauer |
| 4,589,211 A | | 5/1986 | Policka |
| 4,635,372 A | * | 1/1987 | Tande .................... 33/DIG. 10 |
| 4,696,113 A | | 9/1987 | Rice |
| 4,802,284 A | | 2/1989 | Jackson |
| 5,040,304 A | * | 8/1991 | Jackson ........................ 33/528 |
| 5,172,483 A | * | 12/1992 | Yocono et al. ................ 33/528 |
| 5,992,036 A | * | 11/1999 | Cannelli, Jr. ................. 33/528 |

* cited by examiner

Primary Examiner—Christopher W. Fulton
Assistant Examiner—Stanley J. Pruchnic, Jr.
(74) Attorney, Agent, or Firm—Weiner & Burt, P.C.; Irving M. Weiner; Pamela S. Burt

(57) ABSTRACT

An apparatus for determining the location of a wall outlet on wallboard prior to the wallboard being permanently secured includes a body portion that is releasably secured to the outlet box and a plurality of outwardly facing marking pins that form divots in the wallboard when it is temporarily placed in position over the outlet box. After forming the divots and removing the wallboard, the apparatus is then replaced in the divots to show the location of the outlet box on the wallboard from the position of the markings. The apparatus can be traced to show a cutting line for forming an opening in the wallboard to accommodate the outlet box.

2 Claims, 6 Drawing Sheets

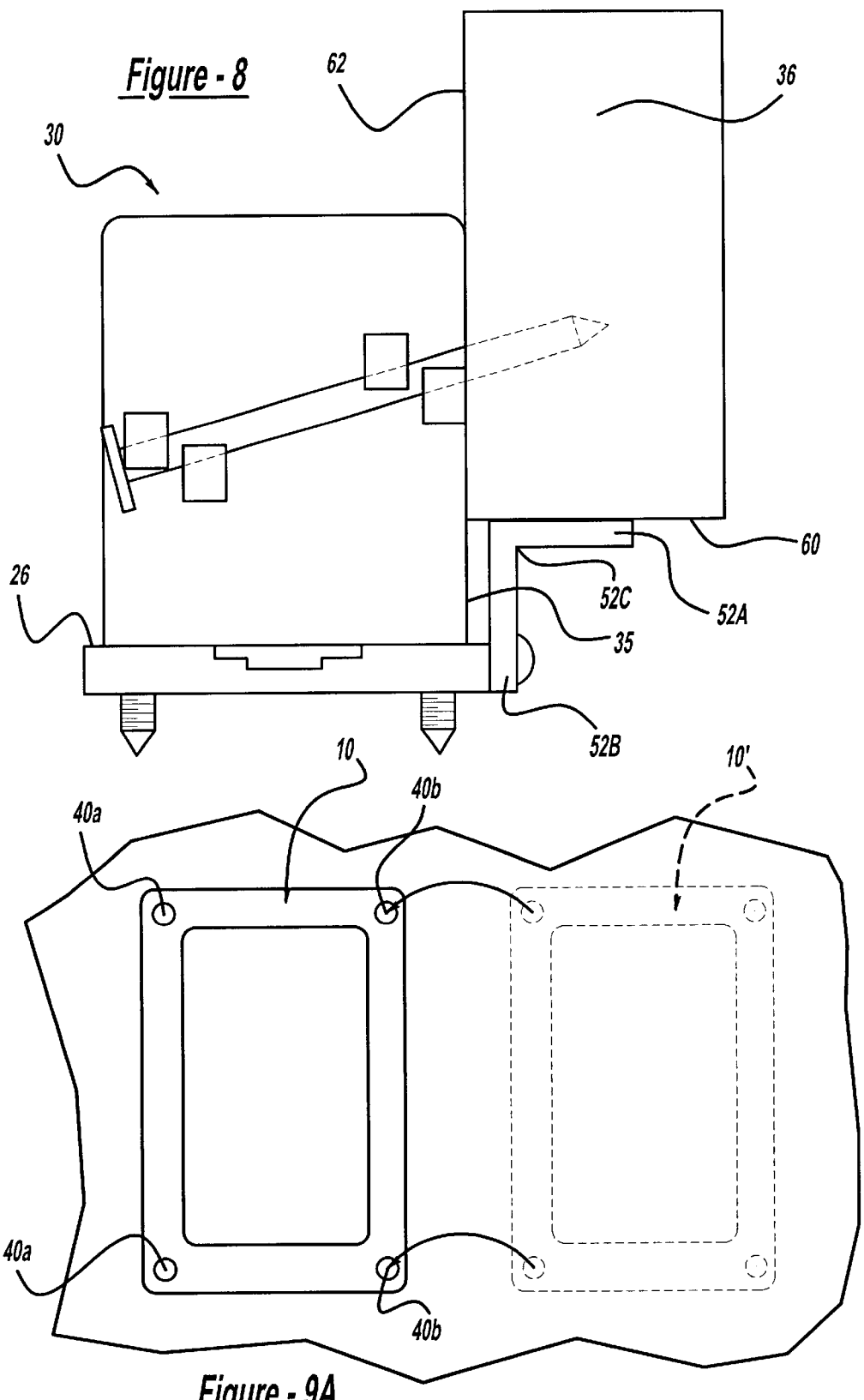

LOCATING AND TEMPLATE APPARATUS

This application claims the benefit of provisional application No. 60/172,173, filed Dec. 17, 1999.

BACKGROUND OF THE INVENTION

1. Technical Field

The present invention generally relates to marking wallboard for properly locating openings for outlet boxes. More specifically, the present invention relates to a method and apparatus for marking wallboard including a body with protruding marking pins and a periphery defining a template for marking an opening to accommodate an outlet box.

2. Discussion

In modern construction practice, wallboard of many different types are installed to provide a wall surface. Additionally, openings must be provided in the wallboard for electrical, phone, computer or television outlets that are installed in the walls. In order to provide access to previously installed outlet boxes for the placement of fixtures, it is necessary to cut box-fitting openings in the wallboard. The operation of cutting box-fitting openings requires precise measurements to properly locate and achieve a desired result. Currently, the process of locating openings is achieved by a series of measurements. This process is costly in terms of time and labor. Additionally, a plurality of measurements can often lead to errors in marking. An error in marking and subsequent cutting of an opening often causes the wallboard to be disposed of at great cost.

The present invention provides a device that properly locates openings in wallboard at the time of installation of the wallboard without taking measurements. Further, the present invention provides a template for marking the relative location of an installed wall outlet box on an uninstalled sheet of wallboard. Alternatively, the template marks the relative location of a multiple gang outlet on an uninstalled sheet of wallboard. Preferably, the present invention provides an apparatus that allows repeatable installation of an outlet box at a desired distance from the wall members.

The locating and template apparatus according to the present invention provides a body that releasably attaches to an outlet box. The body defines a template and a plurality of outwardly facing marking pins to permanently mark the outlet box location on the wallboard for effectively and accurately determining the location of the outlet box with respect to the installed position of the wallboard.

Additional benefits and advantages of the present invention will become apparent to those skilled in the art to which this invention relates from a reading of the subsequent description of the preferred embodiment and the appended claims, taken in conjunction with the accompanying drawings.

BRIEF DESCRIPTION OF THE DRAWINGS

FIG. 8 is a top view of the locating and template apparatus of FIG. 7 in a preferred application according to the invention; and FIGS. 9A and 9B illustrate use of the locating and template apparatus according to the invention for marking wallboard.

DETAILED DESCRIPTION OF THE PREFERRED EMBODIMENT

Figure 1:
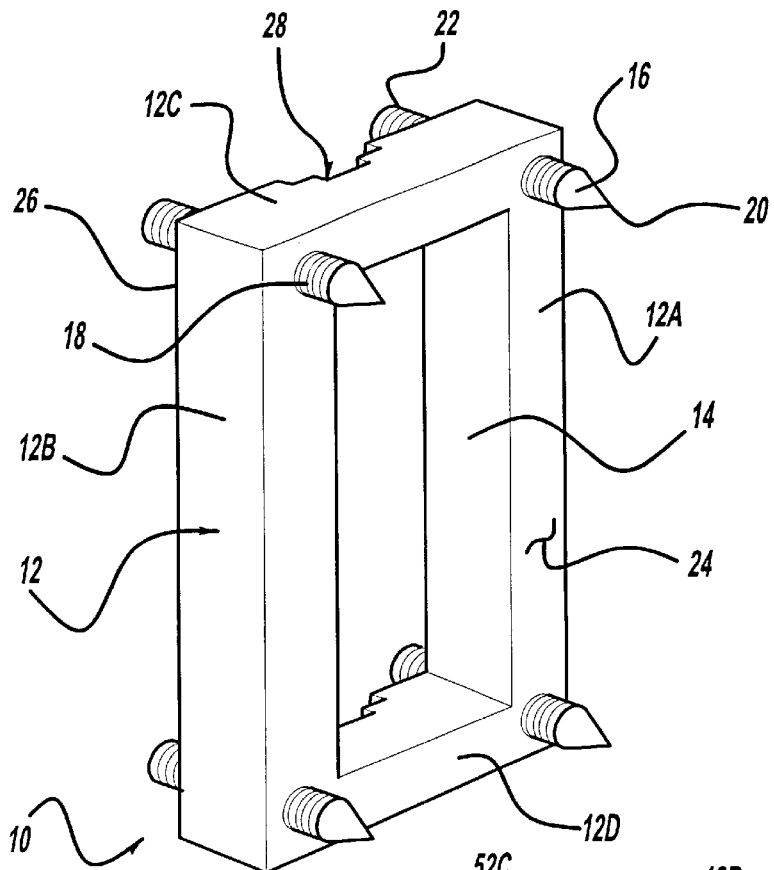
FIG. 1 is a perspective view of the locating and template apparatus according to the present invention shown in relation to the elements of the preferred application.

A preferred embodiment of the present invention, as illustrated in FIG. 1, is a template 10 including a generally rectangular body 12 with an aperture 14 defining an open interior. Preferably, the aperture 14 is large enough to accommodate the face of an outlet or switch therethrough. The body 12 is a generally planar member defined by longer sides 12A,12B joined at their opposite ends by shorter sides 12C,12D, as well as a front surface 24 and a rear surface 26 (not shown). Located near each corner of the generally rectangular body 12 is an aperture 18 with a stud 16 installed therein. The stud 16 may be fixedly or threadedly attached to the body 12 through aperture 18. If threaded, aperture 18 preferably includes a threaded interior surface for securing stud 16. The stud 16 further includes a marking pin 20 proximally located near front surface 24 and a locating peg 22 proximally located near rear surface 26. Additionally, rear surface 26 includes a channel 28 in short sides 12C,12D providing clearance over typical mounting flanges of switches and outlets, as illustrated best in FIG. 2.

Figure 2:
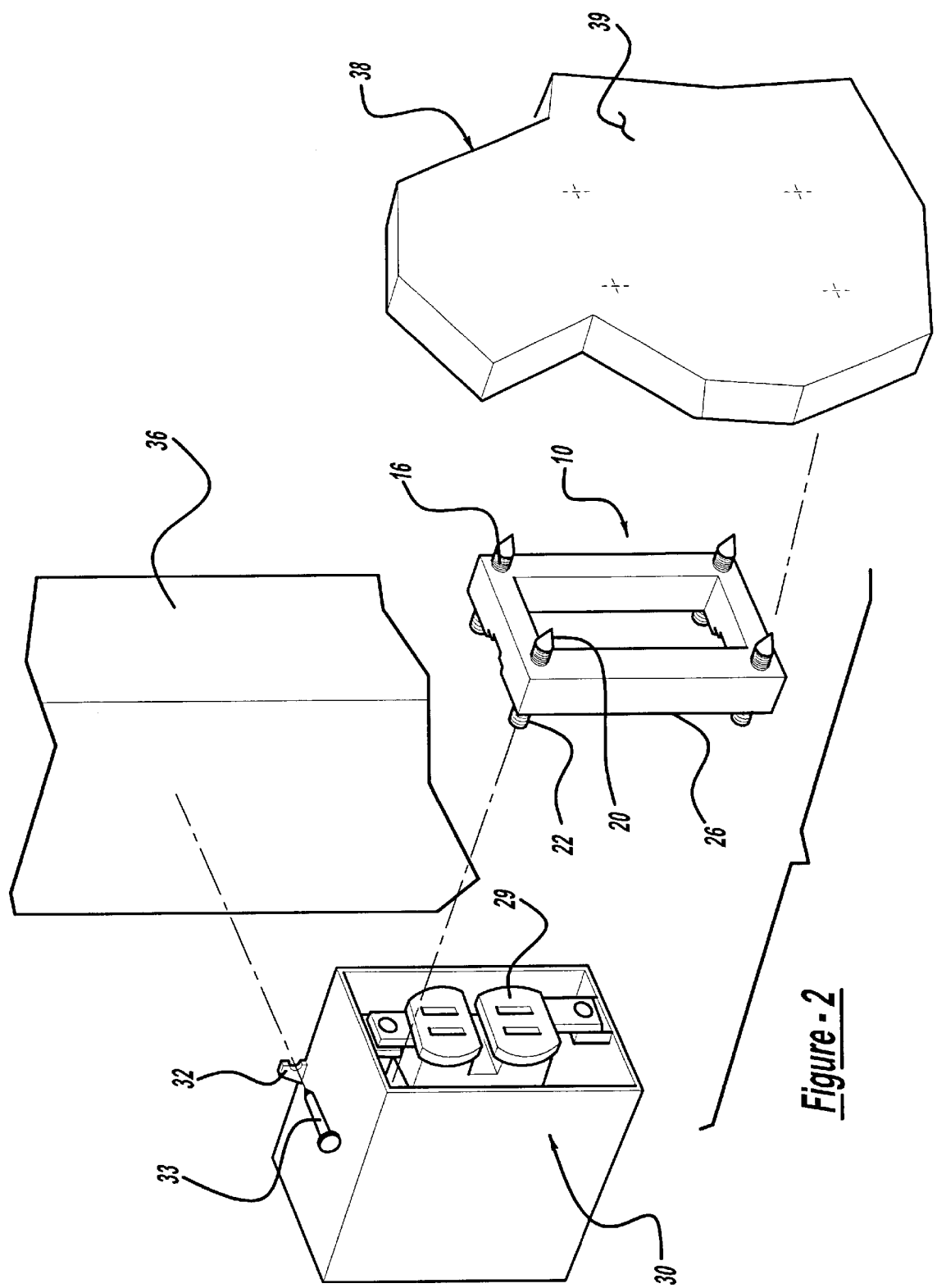
FIG. 2 is a perspective view of the locating and template apparatus of FIG. 1 in a preferred application according to the invention.
Figure 3:
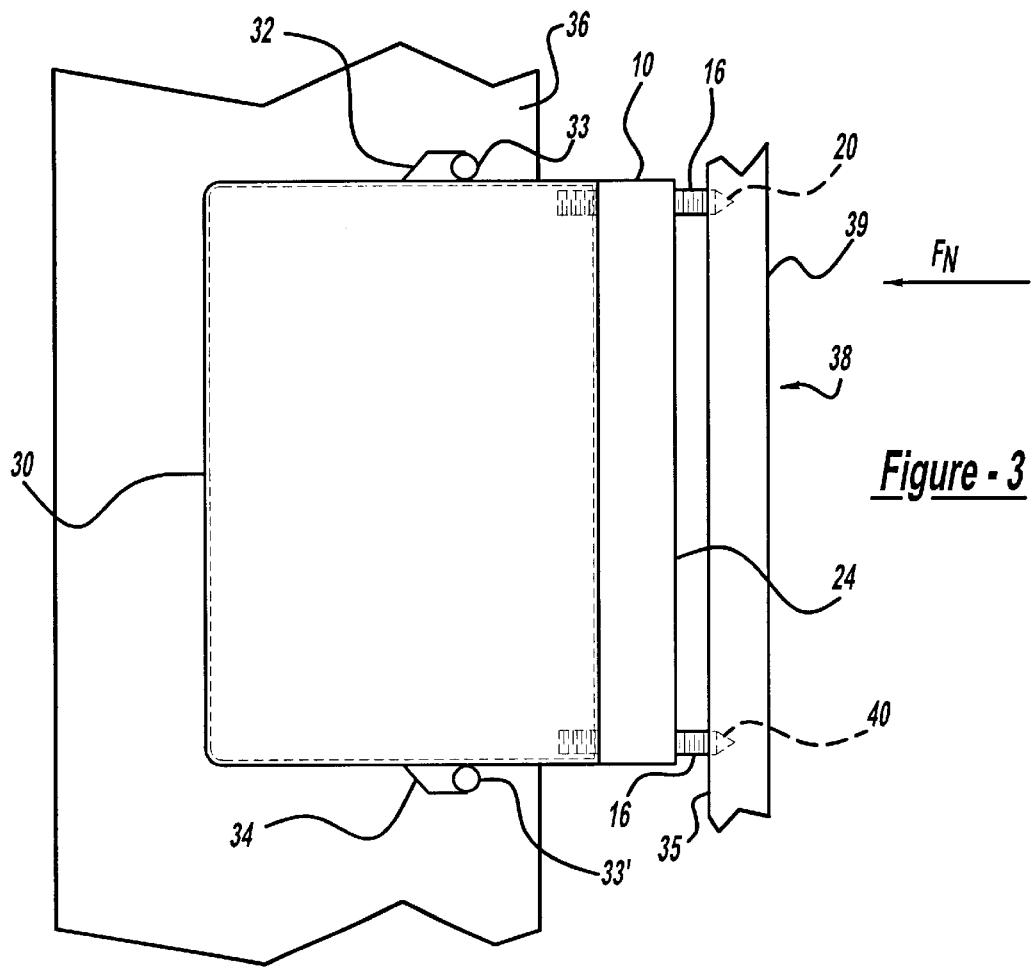
FIG. 3 is a side view of the locating and template apparatus of FIG. 2, including a wallboard being marked according to the invention.

With continued reference to FIG. 2, the template 10 is shown in its preferred application, aligned with a box 30, including an electrical plug 29, for example. The box 30 is well know in the art for providing a receptacle to facilitate access to the ends of electrical, cable, phone and computer wiring. The preferred orientation of template 10 is positioned so that back surface 26 is proximate to the box 30. The locating pegs 22 of studs 16 are positioned at the interior corners of the box 30, while marking pins 20 face outwardly from the box 30 for marking a box location, as best shown in FIG. 3, to accurately mark the location of box 30 on wallboard 38. The channel 28 accommodates the mounting flanges of the electrical plug 29, for example, when using the template 10 to mark boxes 30 having such devices therein. The box 30 is attached to a stud 36 by nails 33 and 33' located in guides 32 and 34. The template 10 is located over the open end of box 30 with marking pin 20 of studs 16 facing away from box 30. The wallboard 38 is located so that a back surface 35 is positioned adjacent to the front surface 24 of the template 10. A normal force $F_n$ is applied to surface 39 of wallboard 38 causing marking pin 20 of studs 16 to create divots 40 on a back surface 35 of wallboard 38.

Figure 4:
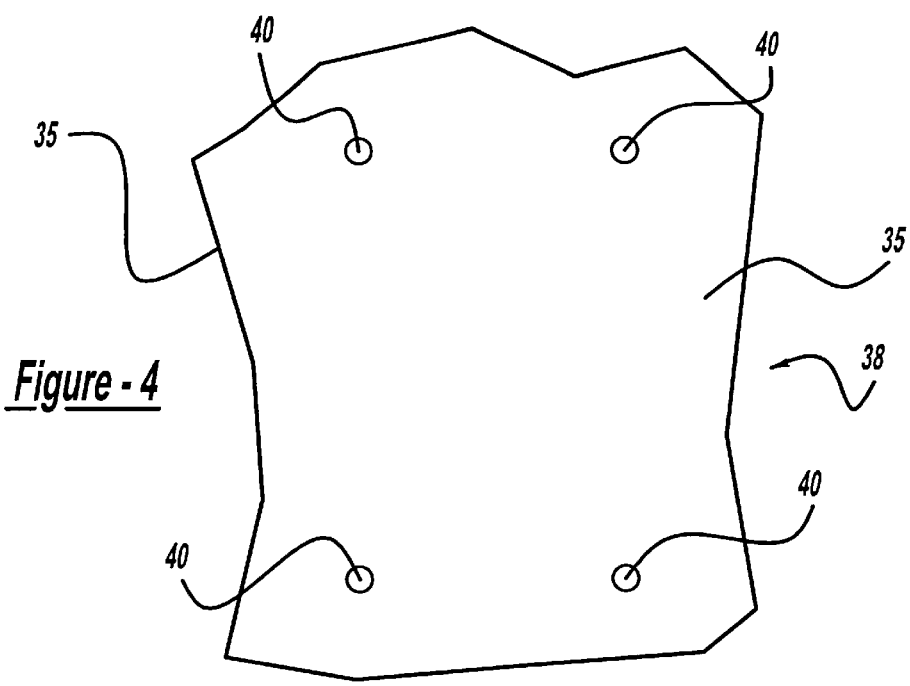
FIG. 4 is a plan view of the wallboard of FIG. 3 illustrating divots made during use of the locating and template apparatus of FIG. 3.
Figure 5:
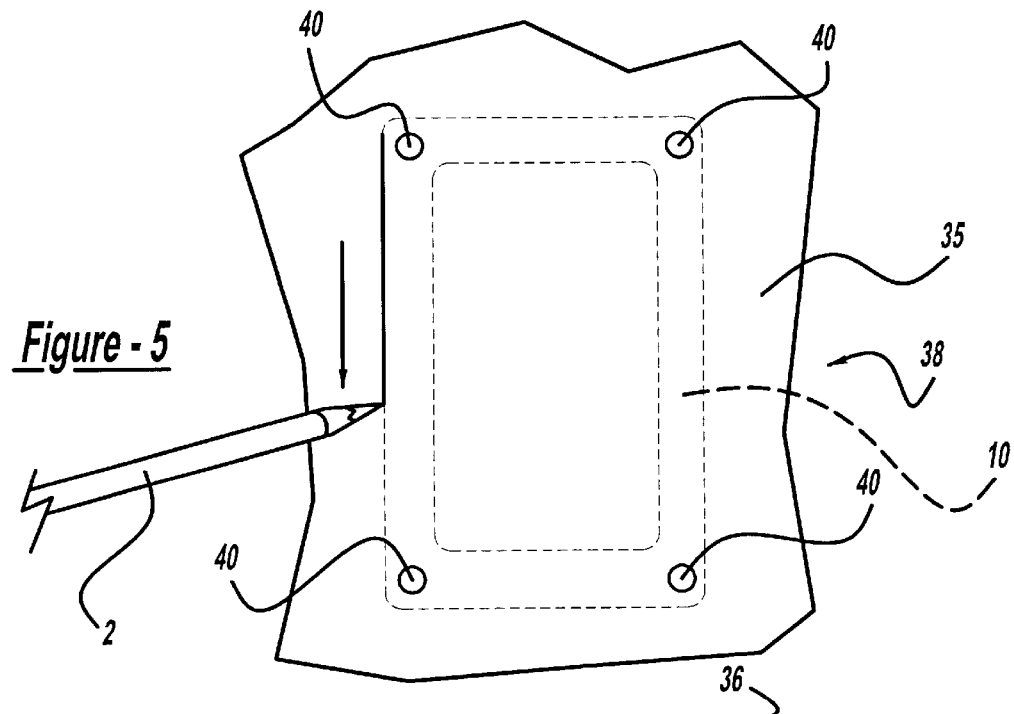
FIG. 5 is a plan view of the wallboard of FIG. 4 illustrating the marking of an opening to be removed by tracing an outline of the locating and template apparatus according to the invention.
Figure 6:
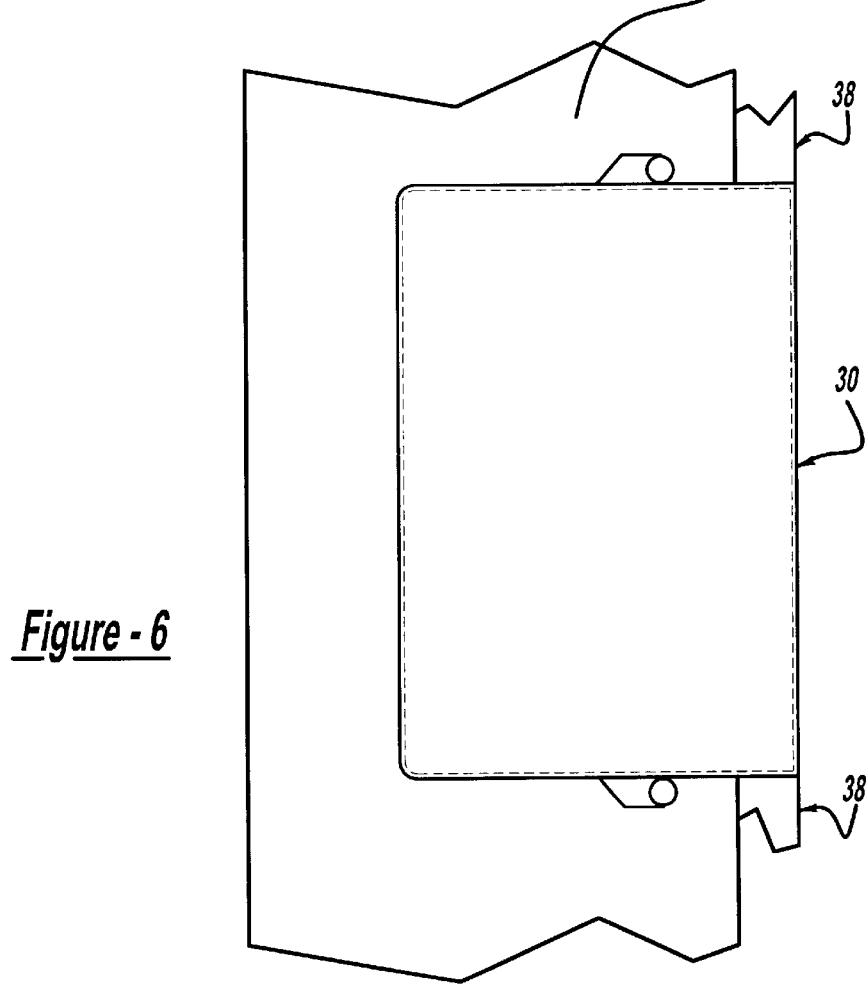
FIG. 6 is a side view of the installed wallboard and outlet box according to the preferred application of the invention.

After force $F_n$ is applied, the wallboard 38 is removed to reveal the divots 40 created by the marking pins 20 on the back surface 35 of wallboard 38, as best illustrated in FIG. 4. The location and configuration of divots 40 mark the location of the outlet box 30 on the wallboard 38 after the wallboard is installed. After the wallboard 38 is removed from adjacent the outlet box 30 and template 10, the template 10 is removed from the outlet box 30 and placed on the back surface 35 of wallboard 38 so that the marking pins 20 register in the divots 40, as shown in FIG. 5. After the template 10 (shown hidden in FIG. 5) is located on surface 35 of wallboard 38, a writing utensil 2 may be used to trace the perimeter of the template 10 to indicate the portion of wallboard 38 to be removed. Once the marked portion is removed, the wallboard 38 is installed over the box 30 as shown in FIG. 6.

Figure 7:
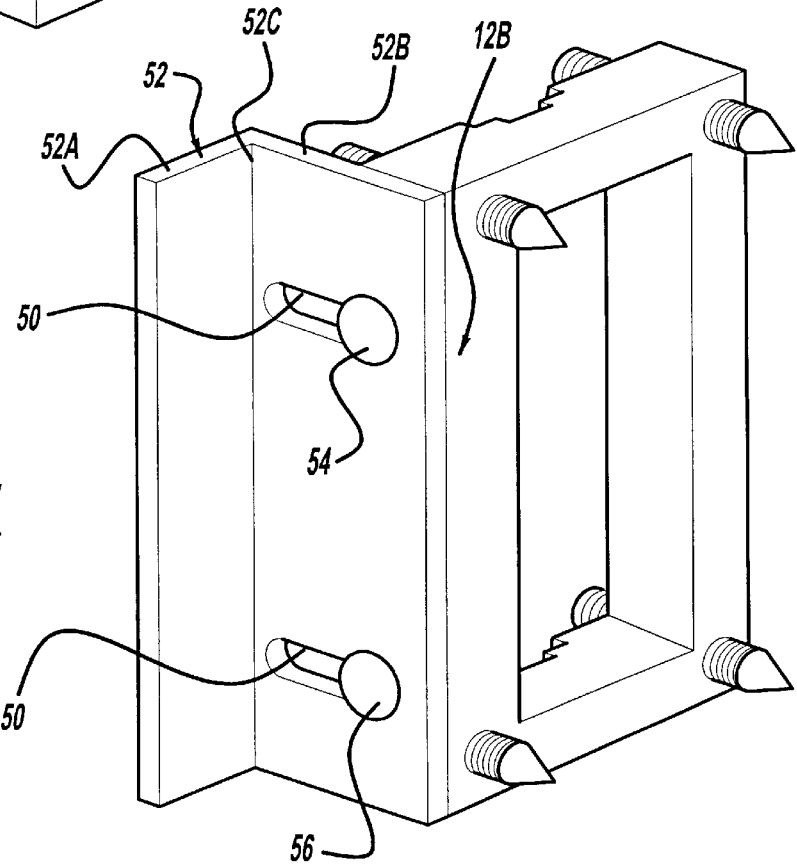
FIG. 7 is a perspective view of a second embodiment of the locating and template apparatus including a depth gauge according to the present invention.

A second preferred embodiment as illustrated in FIG. 7 utilizes the same principles as the embodiment described above with an additional feature. A bracket 52 has been attached to longer side 12B of body 12 via fasteners 54 and 56 to provide a depth gauge for installing a box similar to box 30. Bracket 52 is an angle including a segment 52A disposed generally perpendicular to a segment 52B at a corner 52C. The fasteners 54,56 are preferably slidably located in slots 50 formed in segment 52B to adjustably locate the bracket 52, and thus the template 10, relative a stud 36. The fasteners 54,56 may include a releasable fastener to facilitate adjustment of the bracket 52 relative the template 10.

FIGS. 7 and 8 illustrate how the bracket 52 enables the template 10 to locate box 30 at a predefined depth relative stud 36. This is useful for properly mounting the outlet box 30 to the stud 36, whereby the open end of the outlet box 30 extends at least partially into the opening in the wallboard 38 formed by the removed portion. The template 10 with bracket 52 is used by positioning the back surface 26 of the body 12 to abut box 30 at its open end, as detailed in FIG. 8. A side 35 of box 30 is located along a side 62 of stud 36 and positioned so that segment 52A of bracket 52 rests on front face 60 of stud 36. The slots 50 of the bracket 52 allow a user to properly locate the box 30 relative to the stud 36, which is particularly useful for properly mounting the outlet box 30 for different thickness wallboards 38.

Figure 9B:
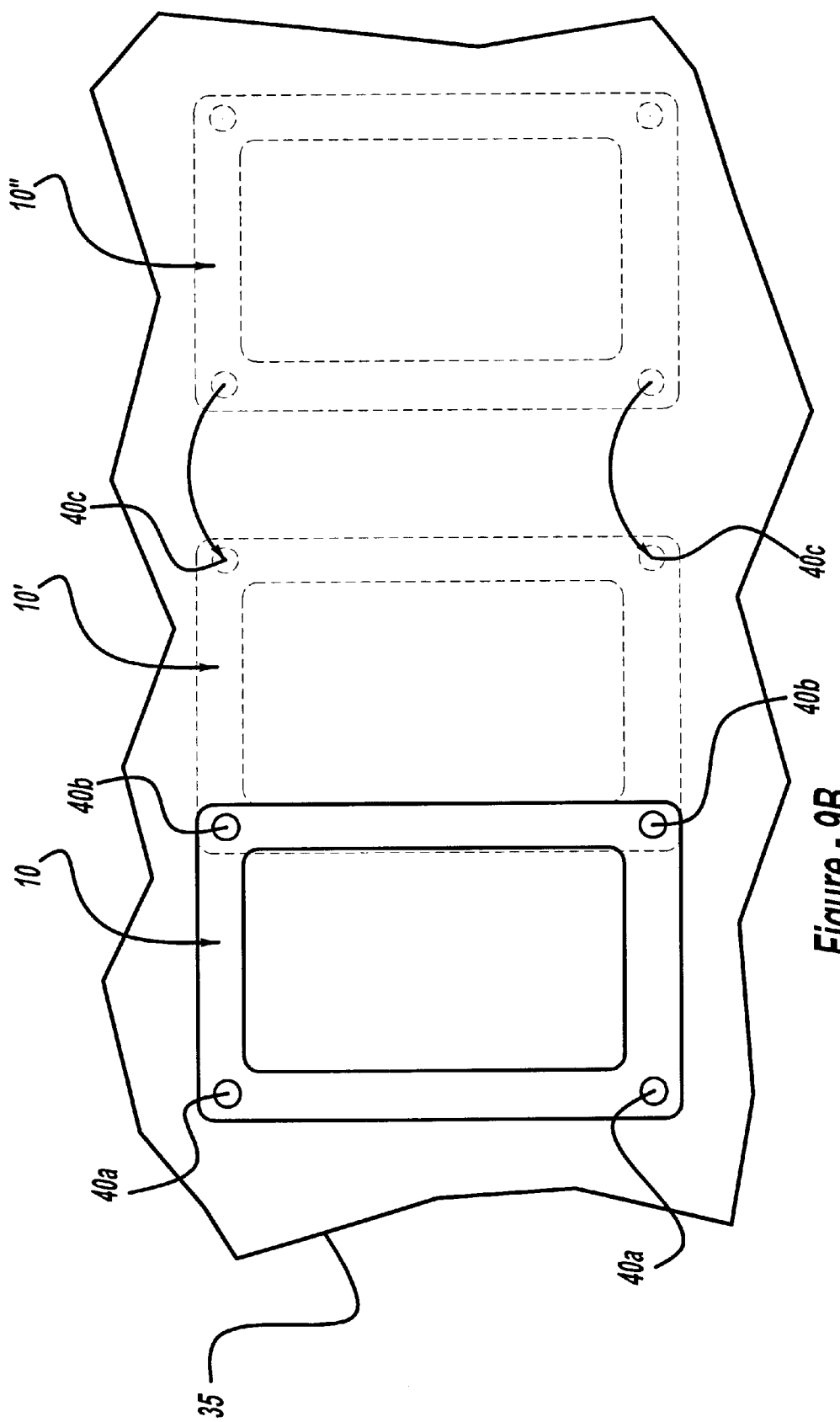

FIGS. 9A and 9B illustrate an additional use for the present invention. In many construction situations, a single electrical box will accommodate multiple switches, plugs, etc., for convenience and aesthetic purposes. In this way, a series of electrical switches, for example, can be placed adjacent one another in a single box. The preferred embodiment of the present application allows for efficient locating and marking of such a multiple-gang electrical box. Consistent with the prior teachings of the present invention, the template 10 is positioned in the box 30 to correspond to a single switch, plug, etc. Once in place, as before, the template 10 is used to impress divots 40 on the back surface of the wallboard 38. These divots 40 mark the location of the single switch, plug, etc. in the multiple-gang electrical box. Once the location of the first gang is marked on the back of the wallboard 36, the template 10 may be used to locate the opening in the wallboard 38 to accommodate additional plugs, switches, etc. To accommodate the additional plugs, switches, etc., the template 10' must be positioned such that the studs 16 that marked the divots 40a are located in the divots 40b of FIG. 9A. The template 10 is then pressed into the wallboard 38 to leave a new pair of divots 40c, as shown in FIG. 9B, that show the wallboard opening required for a second plug, switch, etc. By using the template 10", the studs 16 that marked divots 40a and registered in divots 40b to form divots 40c can be positioned in divots 40c to form additional divots 40 as needed. Accordingly, the aforementioned method can be used to mark the wallboard opening for two, three, four or more plugs, switches, etc. in a single outlet box 30.

While the invention has been described in the specification and illustrated in the drawings with reference to a preferred embodiment, it will be understood by those skilled in the art that various changes may be made and equivalents may be substituted for elements thereof without departing from the scope of the invention as defined in the claims. In addition, many modifications may be made to adapt a particular situation or material to the teachings of the invention without departing from the essential scope thereof. Therefore, it is intended that the invention not be limited to the particular embodiment illustrated by the drawings and described in the specification as the best mode presently contemplated for carrying out this invention, but that the invention will include any embodiments falling within the description of the appended claims.

What is claimed is:

1. An apparatus for determining the location of an installed outlet box for a switch or outlet fixture on wallboard prior to the installation of the wallboard, the apparatus comprising:

a body having a front face and a rear face;

a plurality of marking pins protruding from said front face;

a plurality of locating pegs protruding from said rear face, whereby said locating pegs position said body relative to the outlet box and said marking pins indicate position of said outlet box on the wallboard; and a depth gauge for locating the outlet box at a selected depth relative the wallboard.

2. A template apparatus for determining the location of outlet boxes on wallboard prior to the installation of the wallboard, said apparatus comprising:

a body defining an aperture and having a generally rectangular periphery including corners;

a plurality of marking pins protruding generally perpendicularly from said body adjacent said corners and each having a pointed end;

a plurality of locating pegs protruding generally perpendicularly from said body adjacent said corners in a direction opposite said marking pins; and;

a depth gauge for locating the outlet box at a selected depth relative the wallboard.

* * * * *